Patented Nov. 4, 1941

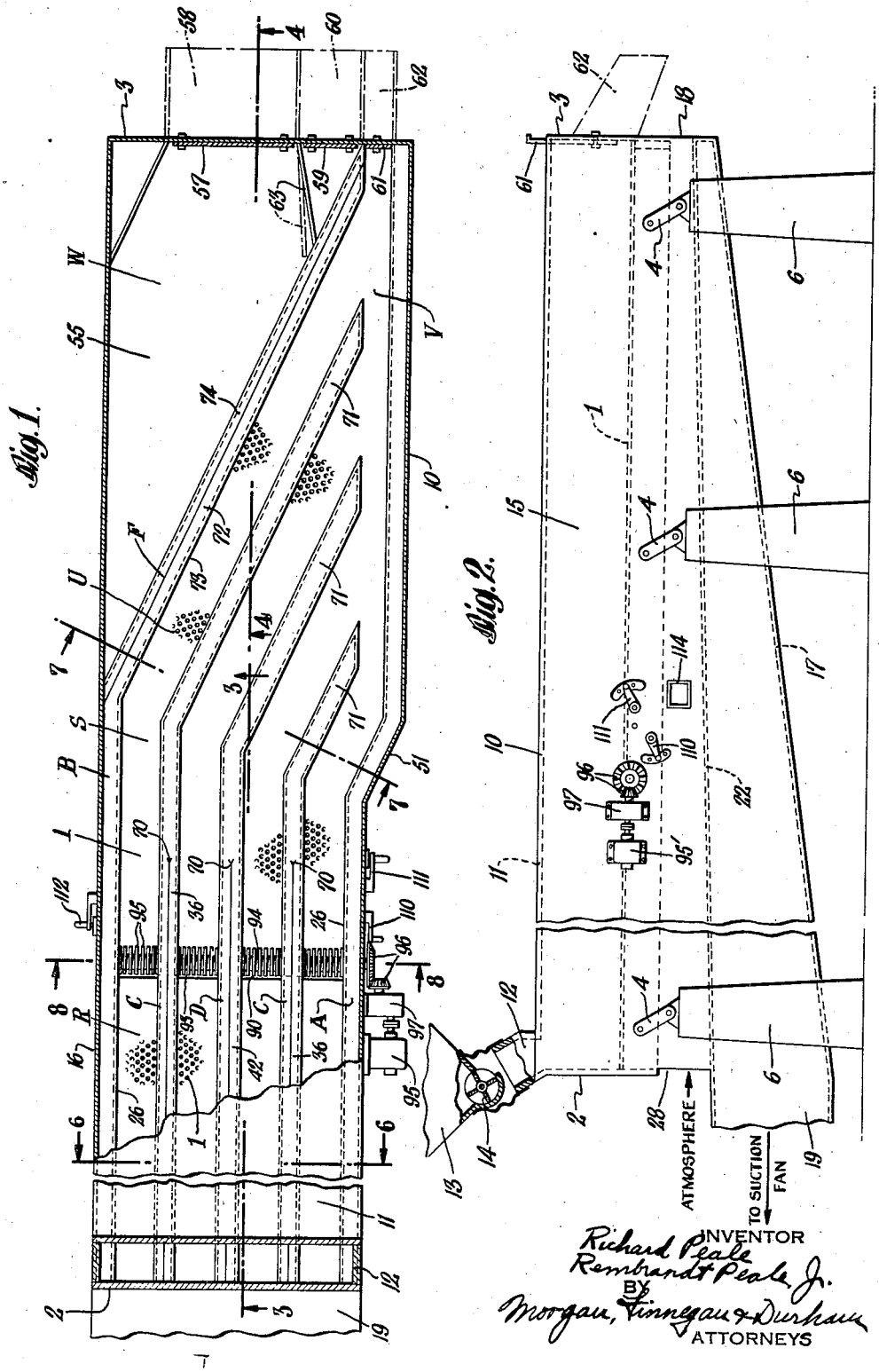

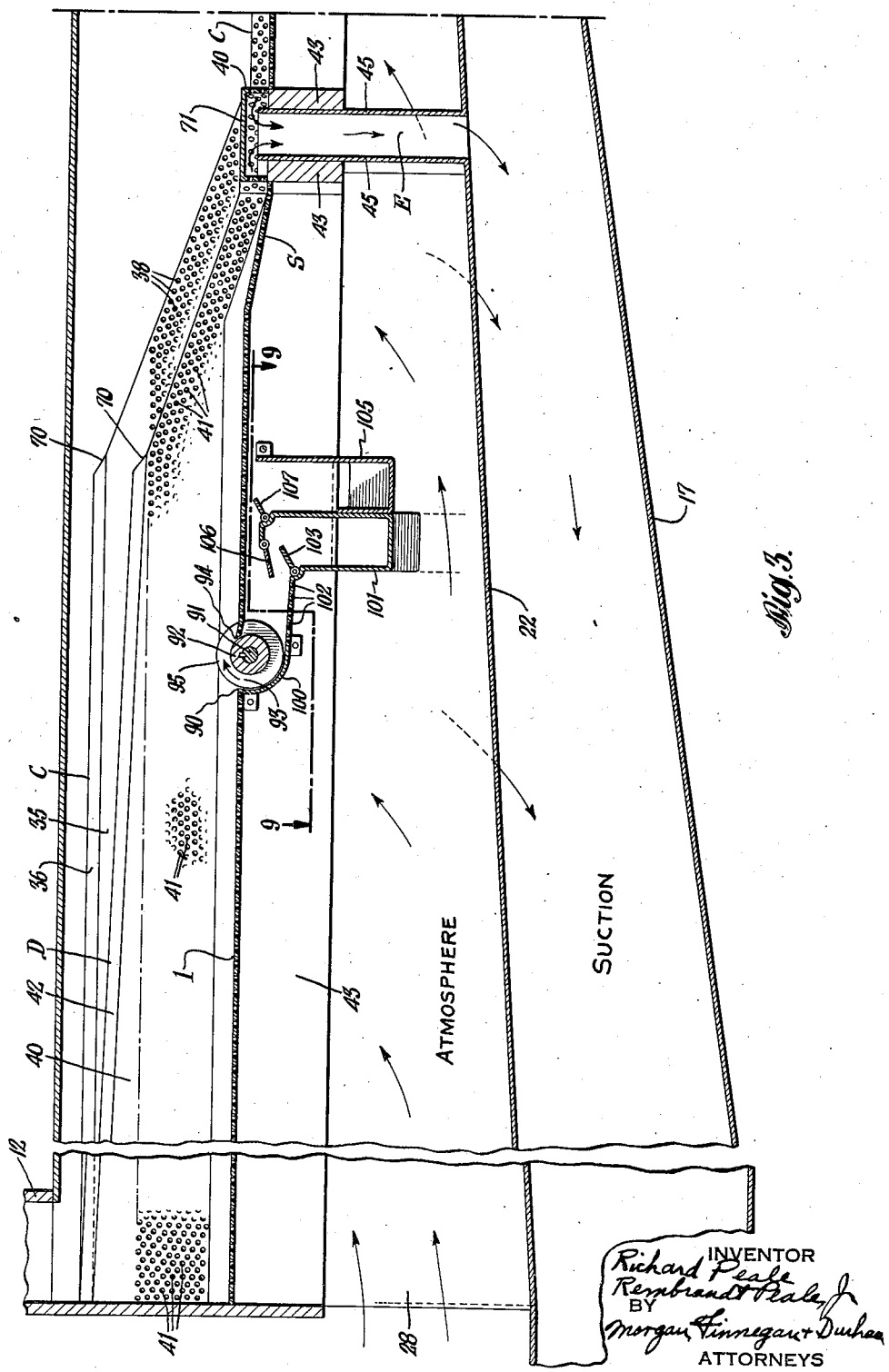

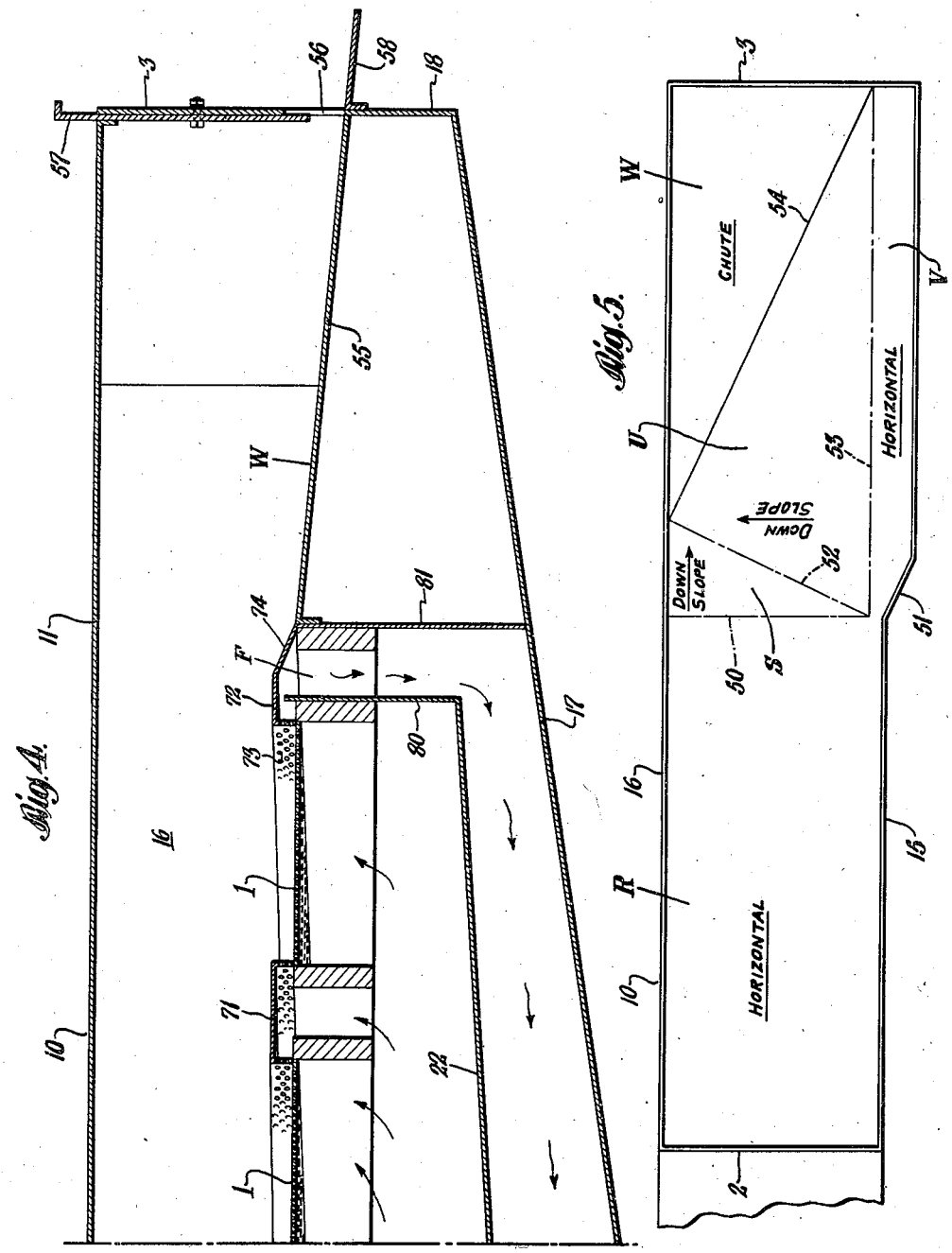

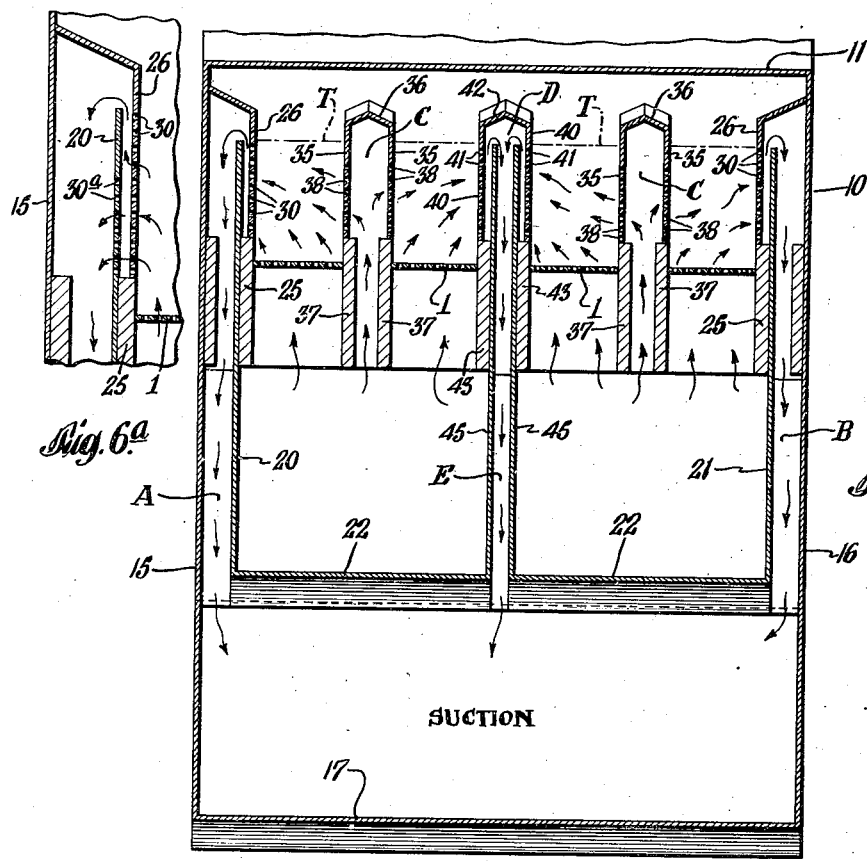
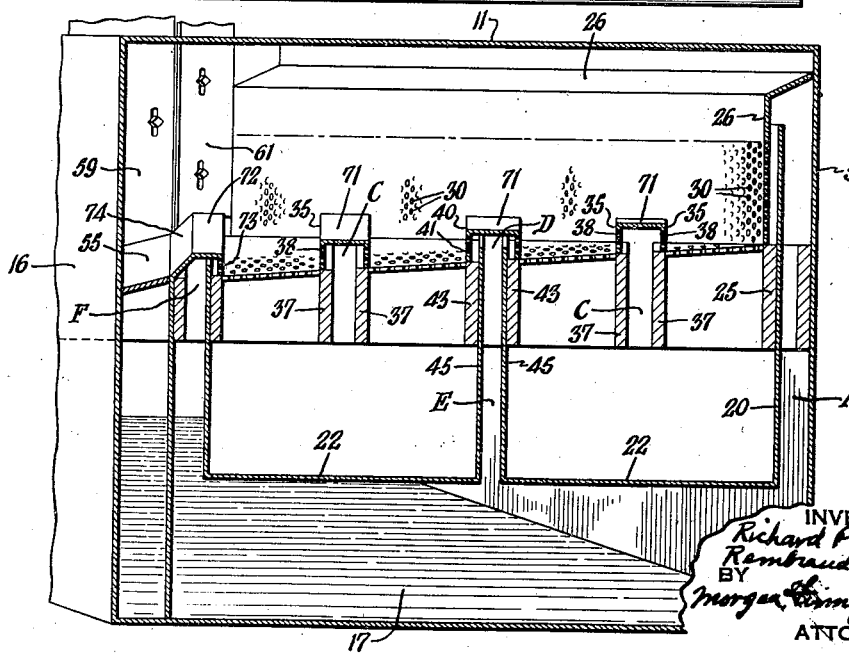

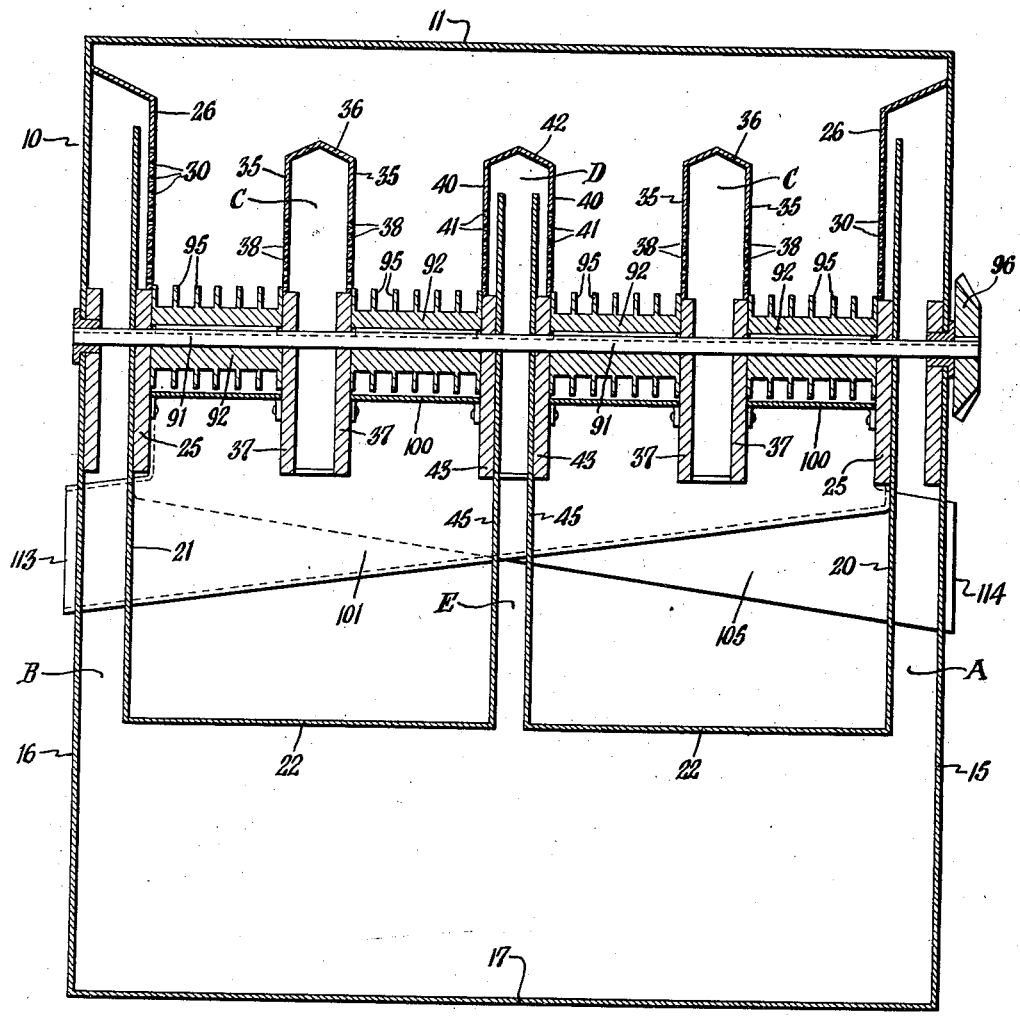

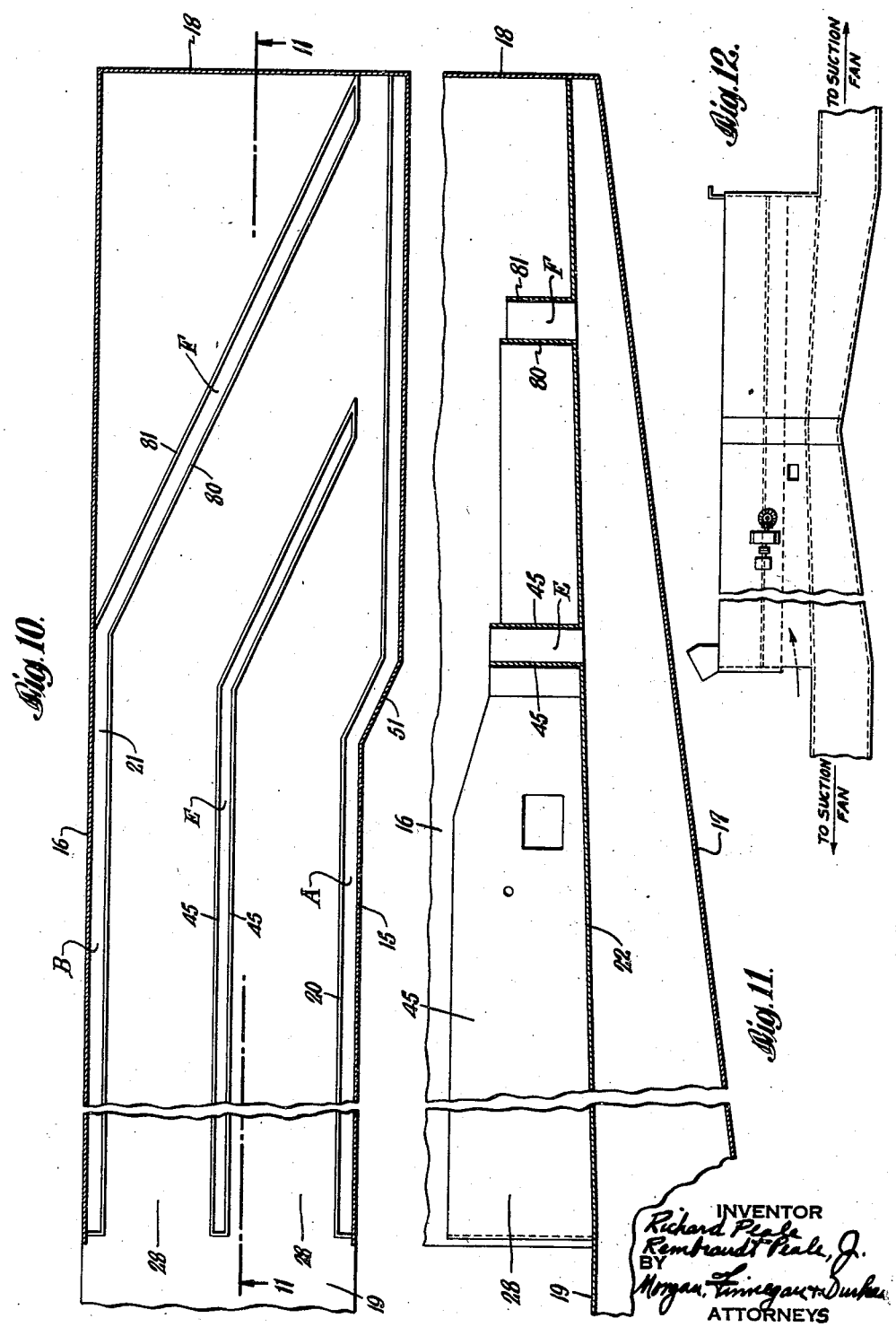

2,261,278

UNITED STATES PATENT OFFICE 2,261,278

PROCESS AND MECHANISM FOR SEPARATING INTERMIXED DIVIDED MATERIALS

Richard Peale and Rembrandt Peale, Jr., Clearfield, Pa.

Application August 9, 1939, Serial No. 289,134

14 Claims. (Cl. 209—467)

The invention relates to processes and mechanism for separating intermixed divided materials according to their specific gravities, such as coal and its impurities, and more especially to such processes and mechanism employing air as the stratifying agent.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 1 is a top plan, with parts broken away, of a separating table embodying the invention;

Fig. 2 is a longitudinal side elevation of the table shown in Fig. 1;

Fig. 3 is a vertical section on line 3—3 of Fig. 1;

Fig. 4 is an enlarged vertical section on line 4—4 of Fig. 1;

Fig. 5 is a diagrammatic plan view of the separator deck, indicating the surface slopes;

Fig. 6 is a vertical section on line 6—6 of Fig. 1;

Fig. 6—A is an enlarged fragmentary detail of a modification of the air duct construction shown in Fig. 6;

Fig. 7 is a vertical section on line 7—7 of Fig. 1;

Fig. 8 is a vertical section on line 8—8 of Fig. 1;

Fig. 9 is a vertical section on line 9—9 of Fig. 3;

Fig. 10 is a partly diagrammatic horizontal section showing the construction and arrangement of suction ducts below the separator deck;

Fig. 11 is a longitudinal section on line 11—11 of Fig. 10; and

Fig. 12 is a reduced side elevation of a separating table showing a modified form of suction supply.

The present invention is in many respects an improvement over the process and mechanism disclosed and claimed in our copending application Serial No. 232,808 filed October 1, 1938; while in other respects the invention comprises independent novel subject matter.

The invention is directed to providing an improved pneumatic-stratification separating process, and a mechanism therefor, in which the stratifying air currents are guided and directed through the bed of intermixed materials so as to avoid size classification or segregation of the particles during the separating action. More particularly, and especially as applied to the purification of coal containing fines, the invention controls the direction and force of the air currents passing through the bed so that the finer particles are not displaced upwardly nor blown toward or out of the top of the bed. By means of the invention the distribution of sizes within the bed of coal is maintained as homogeneous as possible, thereby contributing to uniformity of air pressure and maintenance of the desired static pressure and stratifying conditions throughout the bed.

The present invention, by preventing vertical escape of air currents through the top of the bed, prevents the above-described displacement and segregation of the fines, thus keeping the bed in a uniform size condition conducive to stratification. The invention provides a method and a means for insuring that the air currents will travel into and through the bed very largely in horizontal or transverse non-vertical paths. Consequently, the air action may be made fairly energetic and a considerable pressure drop and loosening effect be provided by the air currents without attendance of the undesirable blowing of the fine material up and out of the bed. As the fine refuse is prevented from rising to the surface of the bed, it will readily settle and remain settled with the other sizes of refuse in the lower strata. In forms of the process and mechanism utilizing transverse flowage of the settled refuse and flotant coal strata, the invention also prevents the fine refuse material from being blown or carried over the tops of the riffles or separating partitions on the deck. Further, by causing the air currents to travel largely in the horizontal direction within the depth of the bed, there will be very little dead air space in the bed, regardless of the existence of impervious portions in the deck surface. Preferably the cross currents or horizontal drafts of air are fairly closely controlled locally so as to maintain the desired directional effect without undue air force or velocity. It is desirable to avoid a sweeping of air blasts over or through the bed surface, which might tend to displace strata laterally.

In addition to the foregoing general objects, which carry out in an improved manner the principles of the process disclosed in our said copending application, the present invention provides novel steps and means for rendering more efficient and economical the distribution and flow of air currents from the suction fan and ducts through the bed of coal and from the surrounding atmosphere. Means are provided for drawing air directly from the bed and into a major suction chamber at loci distributed throughout the length and width of the table or deck, thereby permitting the use of relatively small air withdrawal ducts of uniform cross section and providing for the maximum air action desired at all points within the bed. The invention further provides superior means for regulating the distribution and the velocity of air currents passing through the bed so as to insure the maximum efficiency of stratification while preventing escape of air currents vertically upwardly through the bed and/or otherwise acting to cause size segregation and dislodgement of the finer particles from a fairly uniform distribution throughout the bed. In this connection the invention provides a novel method and means for introducing air into the bed at levels above the bottom of the bed, whereby air passage through the bed may take place along such upper levels without rising from the bottom of the bed.

Another object of the invention is to provide means for removing settled finer particles of refuse or heavy material from the bed and from the separating deck relatively early in the stratifying action. This feature of the invention permits continuation of the separating action on the remaining materials of the bed without disturbing stratification and permits application of more vigorous separating action or supplemental treatment of a different sort to the remaining materials from which fine refuse has been removed. Moreover the novel method and means of removing fine settled refuse early in the process makes it possible to apply a relatively short separating action to beds of materials wherein the range of sizes is in the relatively fine or slack sizes and/or where the refuse is predominately in the finer sizes. Those features of the invention which obviate the size displacement and suspension of the finer particles are conducive to early and rapid settling out of much of the fine refuse and thus make possible the relatively early separate removal of such fine refuse.

It will be understood that the invention is generally applicable to the separation of intermixed divided materials varying in specific gravity, but is particularly directed to the purification of unsized raw coal, or coal containing "fines," the principles of separating action in accordance with differences in specific gravity and in spite of variations in size being utilized in accordance wth the general practice of the Peale-Davis process. Many features of the invention are particularly applicable to the treatment of the finer ranges of unsized coal such as ½"x0 or finer ranges. Such coals are particularly difficult to purify because of the fines, yet the necessity for cleaning is very great, as such sizes are very common especially among the coking coals.

It will be understood that the foregoing general description and the following detailed description as well are exemplary and explanatory of the invention but are not restrictive thereof.

Referring now in detail to the present preferred embodiment of the invention, illustrated by the way of example in the accompanying drawings, the invention utilizes a relatively long and narrow air-pervious deck 1 of generally rectangular outline having a feed end 2 and a discharge end 3. The deck 1 is supported in a box-like frame 10 which reciprocates with the deck. The deck as shown is preferably longitudinally reciprocable, the frame 10 being mounted for that purpose on inclined links 4, the upper ends of which are pivoted to the deck and the lower ends pivotally supported from stationary abutments 6. The driving means are not shown and it will be understood that the mounting and the reciprocating mechanism for the deck are not essential features of the invention, the process being generally applicable to pneumatic separating tables whether stationary or moving, will be clear to those skilled in the art. An air-tight cover 11 overlies the entire deck surface and is fast to the end and side walls of the frame 10 so that the entire upper surface of the deck is closed from access to the atmosphere. A feed trough 12 at the rear end of the deck is flexibly connected to a coal feed hopper 13 having a vaned rotary feeder 14 which acts as a valve to feed coal into the chute 12 but to prevent any substantial amount of air from reaching the space above the deck. In general it will be clear that the foregoing features of the cleaning table are similar to those shown and described in our said copending application Ser. No. 232,808.

In accordance with the invention means are provided for applying suction to the space in levels lying a limited distance above the surface of the deck 1 so as to draw air currents upwardly through the deck and transversely through the bed of materials and out of the bed without permitting passage of such air currents upwardly to escape through the top of the bed. Atmospheric air is admitted to the bottom of the bed of materials through the air pervious deck and to a limited extent at levels within the bed and above the deck so as to provide a thorough aeration of the materials of the bed but without forcing air currents out of the bed through the top. Said air supply means are further adapted to act as separating guides and partitions for the materials during stratification thereof so as to prevent cross shifting of the bed during the early stages of stratification and also, if desired, to effect transverse travel and delivery of the settled heavy and flotant light materials during the more advanced stages of stratification.

As embodied the side walls 15 and 16 of the frame 10 extend downwardly from the top 11 to provide a suction or low-pressure housing or chamber of rectangular cross section beneath the deck and entirely surrounding the same (Fig. 6). To maintain uniform low pressure conditions throughout said chamber, the bottom wall or plate 17 of said chamber is preferably sloped forwardly and upwardly to terminate at the front end wall 18, while the rear end of said chamber extends rearwardly at 19 to communicate with a suction fan, not shown. The deck 1 is suspended within the upper part of the main suction chamber and is housed within a secondary atmosphere or high-pressure chamber having side walls 20 and 21 and bottom plates 22 which extend longitudinally of the main chamber on an angle substantially midway between horizontal and that of the sloping bottom 17. The walls 20 and 21 terminate a substantial distance above the top of the deck 1 and are supportingly connected thereto by longitudinal girders 25. The tops of girders 25 are connected to inner deck suspending walls 26 which extend upwardly a short distance above the top edges of walls 20 and 21 and thence are inclined upwardly and outwardly to be connected to and supported by the side walls 15 and 16. As indicated in the drawings the space within the secondary or pressure chamber formed by the deck 1, the side walls 20 and 21 and the bottom plates 22 is open to the atmosphere at the rear end of the table, through the orifice 28. The size of the orifice and volume of the chamber are such as to maintain air therein substantially static at atmospheric pressure.

It will be clear from the foregoing that suction conduits A and B are formed between the main suction chamber and the side walls 20 and 21 of the secondary pressure chamber, whereby air may be drawn upwardly through the deck 1 and through the bed of material (the top of which is indicated by the broken line T). Communication between the sides of the bed and the suction ducts A and B is afforded by perforations 30 in the vertical walls 26. It will be noted that these perforations extend upwardly from near the top of the deck to a level just below the top of the bed T so that air may be drawn up through the deck and transversely to the side of the bed throughout the entire depth of the bed. The intensity and relative amounts of air which are directed to pass through various levels within the bed may be controlled by the extent and distribution of the perforations 30 and also by the relation and extent of the side walls 20 and 21. As shown in Fig. 6 the walls 20 and 21 are entirely impervious to air and the upper edges are on a level with that of the upper perforations 30 in the walls 26. Thus the walls 20 and 21 act as baffles to distribute the suction action vertically along the sides of the bed. In the form shown in Fig. 6a a relatively great amount of air is permitted to escape from the lower levels of the bed by providing perforations 30a in the baffle walls 20 and 21 between the tops of the girders 25 and the top of the baffle walls. It will be clear that by varying the amount and/or distribution of perforations 30a, practically any desired distribution and direction of air currents between the pervious deck 1 and the sides of the bed may be obtained.

As embodied, supplementary means are preferably provided for introducing atmospheric air into the bed at levels above that of the deck 1, such means also acting as material-guiding and separating partitions. As embodied, a plurality of hollow casings or conduits C are mounted on the surface of the deck 1 to extend longitudinally therealong at spaced parallel sections. Said casings C are formed with vertical walls 35 which extend above the top of the bed T and are roofed over with inverted V-shaped surfaces 36. The vertical walls 35 are preferably supported on longitudinal, spaced-apart girders 37 which extend from slightly above the top of the deck for a substantial distance downwardly into the secondary atmosphere chamber.

The space between the girders 37 thus provides a relatively long and narrow inlet for atmospheric air from the pressure chamber to the casing C. Perforations 38 are provided in both vertical walls 35 of the casing whereby atmospheric air may be drawn from within the casing C into the upper levels of the bed and thence across the bed to exit through the side wall perforations 30, as indicated by the arrows, Fig. 6. Preferably the upper level of the perforations 35 is spaced somewhat below the top of the bed T and lower than that of the upper level of perforations 30, thereby causing the air currents from the casing C to have a slightly upward directions across the bed but without escaping from the top thereof. The perviosity of the suction walls 26, of the pressure walls 38 and of the deck 1 may all be zoned or varied throughout the length of the bed as desired so as to provide the most effective air action for any particular coal.

In practice the bed of materials is preferably divided longitudinally by a plurality of the air-pressure partitions or casings C so as to subdivide the bed into a number of relatively long and narrow sub-sections, whereby the direction and intensity of the air currents can be efficiently and nicely regulated. As shown, the separating table is provided with two such parallel casings C spaced from the side walls 26 about one-fourth the width of the deck 1. With such arrangement there is also provided an intermediate air-suction or low-pressure casing D along the central line of the deck, thereby to provide a source of air suction within the bed and arranged symmetrically with respect to the inner walls of the two air-pressure casings C. As shown, the suction casing D is shaped and constructed exteriorly in a form substantially identical with that of the casings C, having vertical walls 40 with perforations 41 therein and a similarly shaped top closure 42. The lower edges of the walls 40 are supported upon longitudinal, downwardly-extending girders 43 similar to the girders 37. However, the interior of the suction casing D is designed to communicate with the main suction chamber below the deck and to be excluded from communication with the atmosphere. For this purpose longitudinal inner walls 45 extend downwardly from near the top of casing D to communicate with the main suction chamber, thereby effectively dividing in two the secondary pressure or atmosphere chamber below the deck. There is thus formed a suction or low pressure conduit E running from the interior of casing D to the main suction chamber below. As will be clear from Fig. 6, atmospheric air is drawn into casing D through the perforations 41, such air coming both from the intermediate sections of the deck 1 and from the adjacent walls 35 of the casings C. Thereby the various sub-divisions or longitudinal sections of the bed are traversed by air currents of the desired direction and distribution in a substantially uniform manner. It will be understood that the number of pressure casings C and suction conduits A, B and D are not limited to those here shown but may be arranged and distributed as desired in accordance with the size of the mechanism, the material to be treated and the amount of aeration required. Ordinarily, however, a symmetrical arrangement providing alternating sources of high and low pressure, as shown, is the preferred form of the invention.

Referring now to the general arrangement of the separating table and the travel of the materials thereon, the bed of coal is formed at the rear end below the feed chute 12 and, through the impulsion of the reciprocating movement of the table, travels generally forwardly along the deck in a plurality of sub-beds longitudinally divided by the casings C and D. In accordance with Peale-Davis practice the depth of the bed is substantial and is preferably maintained at a uniform height as indicated by the broken line T. Beginning at the feed end the separating deck is rectangular for a substantial part of its length and the direction of travel of all the materials thereon is straight forward in the direction of reciprocation. As appears in Figs. 1 and 5, this rear rectangular portion R of the deck is transversely horizontal, and in that portion the casings C and D are parallel to the longitudinal axis of the table and their height is such that their tops extend a substantial distance above the level T of the top of the bed.

Beyond a median transverse line 50, the deck is preferably widened toward the inner or refuse side, the side wall 51 being inclined forwardly and away from the center of the deck and thence again straight forwardly so that the front portion of the table beyond the line 50 is substantially wider than the rear portion R. As indicated in Fig. 5 this front portion of the deck is provided with differently inclined portions as follows: The triangular section S just beyond the median line 50 inclines longitudinally downwardly to the borderline 52. Thereafter, the triangular area U is inclined laterally downwardly at a gentle angle from the borderline 53 toward the opposite side of the deck. The refuse zone or area V along the wall 51 in front of the borderline 50 continues horizontal at the level of the rear section R. Beyond the diagonal borderline 54 (marking the terminus of the perforated portion of the deck) there is provided a forwardly and downwardly inclined section W which comprises an impervious plate 55 which acts as a coal discharge chute. An orifice 56 is provided in the end wall 3 of the main casing 10 for permitting the discharge of material from the end of chute 55 and from the horizontal refuse zone V. A vertically adjustable coal discharge gate 57 is variably positionable vertically with respect to the orifice 56 and controls the exit of coal from the casing and plate 55 onto a delivery chute 58. Similarly a vertically positionable gate 59 is provided for handling the discharge of middlings from the casing onto a middling chute 60, while a separate vertically positionable gate 61 controls the discharge of refuse from the zone V into the discharge chute 62. The relative quantities of coal and middlings delivered from the plate 55 may be regulated by the rotatable vane 63 between the gates 57 and 59.

In accordance with the invention the materials undergo a preliminary stratification action in the rear longitudinal stratifying area R and in that area a certain amount of settled fine refuse may be removed from the bed as hereinafter described. Beyond the median line 50, the separating action is supplemented by inducing a transverse relative flowage of the flotant coal stratum and the settled refuse, the flotant coal travelling forwardly and somewhat laterally over the tops of separating partitions, while the settled refuse is guided by said partitions to the refuse concentrating zone V along the upper or inner side of the deck and thence to discharge at the front end. In effecting this supplemental transverse separating flowage of the materials, the depth of the bed is preferably somewhat diminished by spreading out the materials over the wider forward portion of the deck, while at the same time the non-vertical air action hereinbefore described is maintained upon the transversely flowing and separating materials of the bed.

For this purpose the air distributing casings C and D in the more forward zones or areas S and U are caused to diminish in height so that they lie below the upper levels or strata of the bed in these areas and thereby function as separating partitions between the upper and lower strata of the bed. At the same time the casings C and D are inclined from the straight forward direction they had in the rear zone R and are caused to extend forwardly and inwardly toward the wall 51 of the table. As will be clear from Figs. 1 and 3, these casings begin to diminish in height at points 70 slightly to the rear of the median line 50 and taper down from their maximum height to a minimum which is well below the top of the bed and preferably less than an inch above the deck. This minimum height is attained approximately along the border line 52. Also beginning approximately along said border line 52, the casings C and D incline forwardly and toward the inner wall 51, as shown. Thus the zone or area S outlines substantially the space within which the transition in shape, height and direction of the casings C and D is accomplished. From said line 52 these casings extend forwardly and inwardly, but terminate substantially along the border line 53 to provide an unobstructed refuse concentrating zone V. It will be noted in Figs. 1, 3 and 4 that the V-shaped outline of the tops of the casings C and D preferably terminates at the point 70, the tops 71 of these casings thereafter being flat in cross section.

An additional aerating and material-separating partition F is provided along the terminal diagonal edge 54 of the deck. As embodied, the air suction conduit B is extended diagonally from the outer wall 75 of the deck parallel to the inclined portions of the casings C and D and terminates parallel with their ends at the end wall 3 of the main frame 10. The casing F is constructed in shape and arrangement generally similar to that of the forward inclined portions 71 of the suction casing D, having the flat top 72 and a perforated rear vertical wall 73. However, the forward wall 74 of casing F is preferably inclined forwardly and downwardly to merge with the plate 55, thereby to facilitate discharge flowage of coal onto the plate. Wall 74 is also imperforate, no air being drawn into casing F from the forward side.

As will be clear from Figs. 4 and 10, suction communication between the main suction chamber and casing F is established by vertical conduit walls 80 and 81 which extend upwardly from the suction chamber to the casing and constitute in effect a transverse continuation of the suction chamber walls 16 and 21 forming the conduit B.

Referring now to those features of the invention which provide for preliminary elimination of settled fine refuse during the early course of stratification, said special refuse removal means are shown in Figs. 1, 2, 3, 8 and 9. In accordance with this feature of the invention, fine settled refuse travelling along the bottom of the deck near the forward portion of the rear zone R is removed directly from the bottom of the deck without interfering with the continued forward travel of the remaining materials of the bed. Particular provision is made for assuring that only the fine heavier materials will be removed by this means while the fine coal particles will remain intermixed in the bed with the coarser coal. The coarser pieces of settled refuse will also continue forwardly for transverse separation and disposal to discharge from the refuse concentrating area V.

As embodied, a transverse slot or opening is provided to extend entirely across the deck 1 near the forward end of the rear zone R. Spaced from the rear edge 90 of said slot and below the level of the deck is a rotatable shaft 91 having a sleeve 92 fixed to rotate therewith. A space 93 is provided between the edge 90 of the slot and the solid core 92 of the sleeve whereby refuse settled on the pervious deck 1 may drop over the edge 90 and between said edge and the core 92 of the sleeve. The forward edge 94 of the refuse slot is placed as closely as possible to the surface of the rotatable core 92 and is bevelled to permit a close moving fit. Thus refuse travelling forwardly along the deck may drop into the opening 93, while material passing over the core 92 will be carried onto the deck over the lip 94. The sleeve 92 and shaft 91 are rotated in the direction of the arrow (Fig. 3) to so advance materials which do not fall into the slot 93. Means for so rotating the shaft 91 comprise a motor 95' mounted on the outside of the frame 10 and driving the shaft through suitable gearing 96 and variable speed reduction 97. Thus fine refuse material which has settled to the surface of the deck 1 will tend to fall into the opening 93, while any material at even slightly higher levels will tend to cross the gap 93 and be carried forwardly by the rotating core 92 and continue along the deck. Similarly any material too coarse to fall into the opening 93 will be urged away therefrom by the rotating core. The core also tends to cause material to pile up behind it to a slight extent before going on. This tendency insures that the settled refuse will accumulate and fall into the slot while lighter material will move on.

Means are provided for preventing large chunks of material from falling into or becoming wedged in the opening 93. As shown, a plurality of closely spaced circular vanes 95 extend from the periphery of the solid core 92 of the refuse roller to just short of the lip 90 of the opening. Thus thin wide pieces of material cannot slide into the opening 93 but will be carried over the opening and away therefrom. The forward edge 94 of the opening is serrated to provide notches through which the vanes 95 can rotate. The size of the fine refuse permitted to enter the gap can be controlled by varying the spacing between the vanes 95.

Means are provided for disposing of the fine refuse delivered into the opening 93 and, cooperating therewith, means for preventing lighter material of small size from falling into said opening or from thereafter being discharged with such separated heavy fines. As embodied, a curved plate 100 leads from the rear edge 90 of the slot around the roller 92 and then forwardly into a refuse discharge receptacle 101. The plate 100 is perforated at 102 to cause air to be drawn upwardly therethrough from the atmosphere chamber and back through the slot 93. Thus a supplementary air blast issues upwardly through opening 93 and tends to prevent fine coal particles from falling with the refuse into the trap. An adjustable vane 103 is provided at the mouth of the receptacle 101 so as to regulate the admission of refuse into the receptacle, thereby building up a body of fine material above the plate 102 and subjecting that material to control and additional stratification. The body of material so held in the receptacle 101 will act to prevent any but the lowermost settled particles from settling into the gap 93 so that fine coal will move along onto the roller. Any lighter material in that body will be floated and tend to stay above the bottom stratum which flows over the edge of vane 103. These upper, lighter particles are guided forwardly and into a middlings receptacle 105 by an adjustable dividing blade 106. Regulation of the amount of middling and/or lighter material admitted to the receptacle 105 may be effected by an adjustable vane 107. Vanes 103 and 107 are externally positionable by means of handles 110 and 111 respectively while blade 106 is similarly adjusted by external handle 112. The materials held in the discharge receptacles 101 and 105 are discharged toward opposite sides of the table, the bottoms of these receptacles being inclined downwardly and outwardly in opposite directions to discharge chutes or spouts 113 and 114 respectively. If necessary means such as one-way covers or flaps on the ends of these spouts may be provided to prevent substantial leakage of air into the receptacles.

Thus the invention provides that only fine, coal-free refuse will be delivered from receptacle 101. When the coal to be treated is quite fine, or the refuse to be removed is all in fine sizes, the table and the treatment therefrom may be curtailed to the rear straight portion R and the forward, transverse-flowage sections S, U and V may be dispensed with.

The modification shown in Fig. 12 provides a table having a plurality of suction fan outlets whereby several suction fans may be used to increase and maintain uniform the desired low-pressure conditions beneath the deck. As shown there is provided a fan outlet for a fan at either end and the chamber below the deck is shaped accordingly; however, several more fans may be tapped into the chamber at intervals along the table where greater suction or uniformity of suction is required.

The invention in its broader aspects is not limited to the specific mechanisms shown and described but departures may be made therefrom within the scope of the accompanying claims without departing from the principles of the invention and without sacrificing its chief advantages.

What we claim is:

1. A pneumatic-stratification mechanism for separating intermixed divided materials varying in specific gravities including in combination means for maintaining a bed of said materials of substantial depth undergoing progressive stratification while traveling along a support, means for introducing air currents into the bed at a level between the top and bottom thereof, means for passing said air currents across the bed between those levels and means for withdrawing air currents from the bed between said levels.

2. A pneumatic-stratification mechanism for separating intermixed divided materials varying in specific gravities including in combination means for maintaining a bed of said materials of substantial depth undergoing progressive stratification while traveling along a support, means for drawing air currents through the bed from a level between the top and bottom thereof and out of the bed between said levels and means for separately delivering the flotant stratum of lighter material and the settled heavy material.

3. A pneumatic-stratification mechanism for separating intermixed divided materials varying in specific gravities including in combination means for maintaining a bed of said materials of substantial depth undergoing progressive stratification while traveling along a support, means for drawing air currents through the bed from a level between the top and bottom thereof and out of the bed between said levels, means for also drawing air currents upwardly from the bottom of the bed and out of the bed between said levels and means for separately delivering the flotant stratum of lighter material and the settled heavy material.

4. In a pneumatic-stratification separating mechanism, in combination, means for maintaining a bed of materials undergoing stratification on a support, means along one side of the bed for supplying air of a relatively high pressure, means along the opposite side of the bed for maintaining air at a relatively low pressure, the bed forming an air-current path between said means and means for confining the passage of air between the top and bottom levels of the bed.

5. The process of separating intermixed divided materials which comprises maintaining a bed of said materials of substantial depth traveling along a support and undergoing specific-gravity stratification, introducing air currents into the bed at levels between the top and the bottom of the bed, passing said air currents through the bed between said levels and removing them from the bed between said levels and separately delivering the flotant stratum of lighter material and the settled heavy material.

6. The process of separating intermixed divided materials which comprises maintaining a bed of said materials of substantial depth traveling along a support and undergoing specific-gravity stratification, introducing air currents into the bed at levels between the top and the bottom of the bed, passing said air currents through the bed between said levels and removing them from the bed between said levels, passing additional air currents upwardly from the bottom of the bed and separately delivering the flotant stratum of lighter material and the settled heavy material.

7. A pneumatic-stratification mechanism for separating intermixed divided materials varying in specific gravities including in combination means for maintaining a bed of said materials of substantial depth undergoing progressive stratification while traveling along a support, air-pervious means exposed to atmospheric pressure throughout the length of the bed, air-pervious means extending along the bed adjacent to said first air-pervious means and exposed throughout its length to a source of substantially constant suction or low pressure and means for passing air currents through said first means, through the bed and into the second means at levels below the top of the bed.

8. A pneumatic-stratification mechanism for separating intermixed divided materials varying in specific gravities including in combination means for maintaining a bed of said materials of substantial depth undergoing progressive stratification while traveling along a support, a gap in said support for the entrapment of fine settled heavy material, and a rotating member mounted beyond said gap to impart a supplementary advancing movement to other materials in the bed in the direction of travel of the bed to prevent same from being trapped in the gap, the member having rearwardly extending spaced fins for preventing any coarse material from entering said gap, said support being air pervious and means for passing air currents through the support and bed of material thereon to effect said stratification.

9. A pneumatic-stratification mechanism for separating intermixed divided materials varying in specific gravities including in combination means for maintaining a bed of said materials of substantial depth undergoing progressive stratification while traveling along a support, a gap in said support for the entrapment of fine settled heavy material, a rotating member mounted beyond said gap to impart a supplementary advancing movement to other materials in the bed in the direction of travel of the bed to prevent same from being trapped in the gap, said member having spaced sizing members extending across the gap to prevent entrance of coarse materials into the gap, said support being air pervious and means for passing air currents through the support and bed of material thereon to effect said stratification, and means at said gap for passing a supplementary current of air upwardly and rearwardly through the gap to prevent fine light material from being trapped therein.

10. In a pneumatic stratification mechanism in combination means for maintaining a bed of intermixed divided materials of different specific gravities undergoing progressive stratification while traveling along a support, means for passing air currents across the bed at levels between the top and bottom thereof for aerating and stratifying the particles, said means extending substantially throughout the depth of the bed at the part of the support adjacent the feed-on locus, and extending throughout only a part of the depth of the bed adjacent the discharge locus, whereby substantially all strata are aerated during the early stages of stratification and only a part of said strata during the later stages.

11. In a pneumatic stratification mechanism in combination means for maintaining a bed of intermixed divided materials of different specific gravities undergoing progressive stratification while traveling along a support, means for passing air currents across the bed at levels between the top and bottom thereof for aerating and stratifying the particles, means for discharging a flotant superior stratum of coal and a settled stratum of heavy material from different parts of the bed and means for confining the passage of said air currents to progressively lower strata of the bed as material from said flotant stratum is discharged.

12. The process of separating intermixed divided materials which comprises maintaining a bed of said materials of substantial depth traveling along a support and undergoing specific-gravity stratification, passing air currents through the bed between the top and bottom levels thereof, said air currents being supplied to substantially all levels of the bed during the initial stages of stratification, but confining the supply thereof to the lower levels of the bed during later stages of the separating action.

13. The process of separating intermixed divided materials which comprises maintaining a bed of said materials of substantial depth traveling along a support and undergoing specific-gravity stratification, passing air currents substantially horizontally through the bed between the top and bottom levels thereof, progressing a flotant superior stratum of lighter material to discharge, guiding a settled stratum of heavy material to discharge in a different direction, subjecting substantially the entire bed to the action of said air currents during the initial stages of stratification, and subjecting only a part of the strata of the bed to said air currents during the later stages of separating action.

14. The process of separating intermixed divided materials which comprises maintaining a bed of said materials of substantial depth traveling along a support and undergoing specific-gravity stratification, passing air currents substantially horizontally through the bed between the top and bottom levels thereof, progressing a flotant superior stratum of lighter material to discharge, guiding a settled stratum of heavy material to discharge in a different direction, subjecting substantially the entire bed to the action of said air currents during the initial stages of stratification, and subjecting only the lower strata of the bed to said air currents during the later stages of separating action.

RICHARD PEALE.
REMBRANDT PEALE, Jr.